United States Patent [19]

La Via et al.

[11] B 4,001,455

[45] * Jan. 4, 1977

[54] SWEETENING COMPOSITIONS

[75] Inventors: Anthony Laurence La Via, East Brunswick; John Anthony Hill, New Brunswick, both of N.J.

[73] Assignee: E. R. Squibb & Sons, Inc., Princeton, N.J.

[ * ] Notice: The portion of the term of this patent subsequent to Oct. 3, 1989, has been disclaimed.

[22] Filed: Feb. 5, 1974

[21] Appl. No.: 439,778

[44] Published under the second Trial Voluntary Protest Program on February 3, 1976 as document No. B 439,778.

Related U.S. Application Data

[63] Continuation-in-part of Ser. No. 22,687, March 25, 1970, abandoned.

[52] U.S. Cl. .............................................. 426/548
[51] Int. Cl.$^2$ ......................................... A23L 1/236

[58] Field of Search ............ 426/217, 212, 364, 548

[56] References Cited

UNITED STATES PATENTS

| | | | |
|---|---|---|---|
| 3,642,491 | 2/1972 | Schlatter | 426/217 X |
| 3,695,898 | 10/1972 | Hill et al. | 426/217 |
| 3,780,189 | 12/1973 | Scott | 426/217 X |

*Primary Examiner*—A. Louis Monacell
*Assistant Examiner*—Esther L. Massung
*Attorney, Agent, or Firm*—Lawrence S. Levinson; Merle J. Smith; Burton Rodney

[57] ABSTRACT

Sweetening compositions which mask the aftertaste of saccharin and potentiate its sweet taste contain saccharin together with an amount of a sweet tasting dipeptide in a quantity effective to mask the aftertaste of saccharin.

2 Claims, No Drawings

SWEETENING COMPOSITIONS

RELATED APPLICATION

This application is a continuation-in-part of our co-pending application Ser. No. 22,687, filed Mar. 25, 1970 now abandoned.

BACKGROUND OF THE INVENTION

Saccharin is commonly employed as a sugar substitute but suffers the drawback of having an objectionable bitter, metallic aftertaste. It has been reported that from one-quarter to one-third of the population are "saccharin sensitive" and perceive an off-taste regardless of the saccharin concentration. It has also been reported that the incidence of off-taste due to saccharin is a function of the concentration of the compound and that everyone can be expected to obtain an off-taste from saccharin at some concentration. It has been suggested to eliminate the aftertaste by combining saccharin with such ingredients as pectin or sorbitol, dextrose, maltose, etc., but such a combination has not overcome the problem. Combinations containing saccharin and salts of cyclamates in certain proportions, while widely used, have also failed to overcome the problem of objectionable aftertaste.

On a weight for weight basis saccharin at its threshold level of sweetness is about 700 times as sweet as sucrose. This greatly enhanced sweetness of saccharin relative to sucrose decreases as the concentration of saccharin increases. At normal use levels saccharin is only 150–200 times as sweet as sucrose. Consequently, to obtain a given increase in sweetness level with saccharin it is necessary to employ a proportionately greater concentration of saccharin. This increased level of saccharin causes a larger segment of the population to perceive an objectionable aftertaste. While individuals vary in the degree to which they find the aftertaste of saccharin objectionable, the occurrence of the objection is so widespread that considerable effort has been expended in devising formulations to overcome this problem. The problems caused by the aftertaste of saccharin are compounded in products such as preserves, jams and jellies which normally have sugar concentrations of up to 60 to 75%. Substituting a quantity of saccharin which gives a sweetness equivalent to this quantity of sugar results in a noticeably undesirable aftertaste.

Objects of the Invention

It is, accordingly, an object of the present invention to provide sweetening compositions containing saccharin in which the aftertaste due to saccharin is masked. Another object is to provide sweetening compositions containing saccharin which have a taste which is free of objectionable flavor qualities. A further object is to provide sweetening compositions containing saccharin which have a taste comparable to or superior to that of sugar. These and other objects of the present invention will be apparent from the following description.

Summary of the Invention

It has now been found that the aftertaste of saccharin is masked by adding a sweet tasting dipeptide ester to saccharin. The dipeptide ester need be present in only very small quantities. Even when present in undetectable amounts, that is, amounts below their threshold level of taste, the dipeptide esters of the present invention begin to manifest their effectiveness in overcoming the objectionable aftertaste due to saccharin.

DETAILED DESCRIPTION

The dipeptide ester sweetening agents employed according to the present invention are superior to sucrose in sweetness and possess a lingering sweetness which has been found by taste panel evaluation to be preferable to that of sucrose. The dipeptide esters of the present invention have the surprising ability of masking the bitterness and potentiating the sweet taste of saccharin. This effect has long been sought for and although many formulations have been stated to achieve it, this effect has heretofore not been attained. The dipeptide ester sweetening agents of the present invention have a fairly constant ratio of sweetness to that of sucrose over all sweetness levels. Saccharin, on the other hand, is found to be 700 times as sweet as sucrose when both are compared at their threshold levels of sweetness but only 150 to 200 times as sweet as sucrose at normal use levels.

The dipeptide esters of the present invention are L-aspartyl dipeptide lower alkyl esters of the formula:

$$H_2NCHCONHCHCOO\text{—}R$$
$$\phantom{H_2NCHCON}|\phantom{HCHCOO\text{—}}|$$
$$\phantom{H_2NCHCON}CH_2\phantom{HCHCOO}Z$$
$$\phantom{H_2NCHCON}|$$
$$\phantom{H_2NCHCON}COOH$$

wherein Z is:
—R

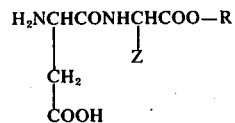

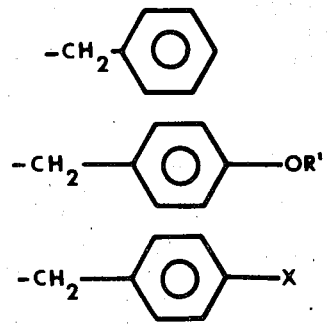

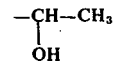

—(CH$_2$)$_n$S(O)$_m$R wherein R is an alkyl radical of up to 6 carbon atoms, or an alkyl-aryl or alicyclic radical of 3 to 10 carbon atoms, R' is hydrogen or an alkyl radical of up to 6 carbon atoms, m is 0 or 2, n is 1 or 2, and X is halogen, (F, Cl, Br, or I).

The lower alkyl radical symbolized by R and R' above are typified by methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl, and 2,3-dimethyl-n-butyl. R may be, as mentioned previously, an alkyl-aryl or an alicyclic radical of up to 10 carbon atoms. Examples of alkyl-aryl radicals are benzyl, phenethyl, isopropylphenyl, 3-phenylpropyl and isopropylbenzyl. Examples of alicyclic radicals are cyclopropyl, cyclobutyl, cyclopentyl, cyclohexyl, cycloheptyl and cyclooctyl.

By way of example of specific peptides which may be employed in the present invention in the form of their lower alkyl esters, there may be mentioned L-aspartyl-L-tyrosine, L-aspartyl-L-O-ethyltyrosine, L-aspartyl-L-methionine, L-aspartyl-L-threonine, L-aspartyl-L-S-ethylcysteine, L-aspartyl-L-methionine sulfine, L-aspartyl-L-phenylalanine, L-aspartyl-L-O-methyltyrosine, L-aspartyl-L-S-methylcysteine, L-aspartyl-L-S-methyl-cysteinesulfone, L-aspartyl-L-p-fluorophenylalanine, L-aspartyl-L-p-chlorophenylalanine, and L-aspartyl-L-2-aminoheptanoic.

The dipeptide esters of the present invention demonstrate an effect in masking the aftertaste of saccharin when present in an amount less than and up to about their threshold level of taste. Greater amounts are unnecessary and uneconomic as the dipeptides of the present invention are more expensive than saccharin. For many applications, e.g., soft drinks, a relatively expensive sweetening agent cannot be employed. In such situations the quantity of dipeptide employed will be at least that level or near that level at which masking of the saccharin aftertaste begins. In most applications, e.g., drugs and medicinals where cost considerations are not as critical, higher amounts of dipeptide, i.e., up to about their threshold level of taste with appropriate pharmaceutically acceptable carriers may be employed. The threshold level of taste of the dipeptide esters of the present invention is about 0.001% to about 0.0015% by weight. Amounts as low as about 0.000125% of a dipeptide ester employed herein are effective to mask the aftertaste of saccharin, preferably from about 0.0002% by weight to about 0.001% or about 0.0015% by weight.

The saccharin may be employed in the form of pharmaceutically acceptable alkali metal salt, ammonium salt, or amine salts, e.g., the N-methylglucamine salt, or the alkaline earth metal salt, or as the free acid.

Specific examples of consumable materials containing saccharin and a dipeptide ester sweetening agent wherein the dipeptide ester is present in an amount at least effective to mask the aftertaste of saccharin and not above about the threshold level of taste of the dipeptide ester are fruits, vegetables, juices, meat products such as ham, bacon and sausage, egg products, fruit concentrates, gelatins, jams, jellies, preserves, milk products such as ice cream, sour cream and sherbet, ices, syrups such as molasses, corn, wheat, soybean and rice products such as bread, cereal, pasta and cake mixes, fish, cheese and cheese products, nut meats and nut products, beverages such as coffee, tea, non-carbonated and carbonated soft drinks, beers, wines and other liquors, confections such as candy and fruit-flavored drops, condiments such as herbs, spices and seasonings, flavor enhancers such as monosodium glutamate, chewing gum, instant mixes, puddings and coffee whiteners. Consumable toiletries such as mouthwashes and toothpaste as well as proprietary and non-proprietary pharmaceutical preparations are also contemplated.

The following examples illustrate the present invention without, however, limiting the same thereto.

EXAMPLE 1

A solution is prepared containing 0.3 mg of sodium saccharin and 0.00625 mg of L-aspartyl-L-phenylalanine, methyl ester, in 5 ml of water. The solution contains 0.006% sodium saccharin and 0.000125% of the dipeptide, the rato of the two materials being 48:1. The concentration of the dipeptide is one-tenth that of its threshold level of sweetness. Taste tests on this solution do not reveal any of the aftertaste normally found with solutions containing this quantity of saccharin.

EXAMPLE 2

A solution is prepared containing 0.3 mg of sodium saccharin and 0.025 mg of L-aspartyl-L-phenylalanine, methyl ester, in 5 ml of water. The solution contains 0.006% sodium saccharin and 0.0005% of the dipeptide, the ratio of the two materials being 12:1. The concentration of the saccharin is equal to the threshold level at which the bitter aftertaste is detectable while the concentration of the dipeptide is one-quarter that of its threshold level of sweetness. Taste tests on this solution do not reveal any of the aftertaste normally found with solutions containing this quantity of saccharin.

EXAMPLE 3

A solution is prepared containing 0.3 mg of sodium saccharin and 0.05 mg of L-aspartyl-L-phenylalanine, methyl ester, in 5 ml of water. The concentration of saccharin (0.006%) is equal to the threshold level for its bitter aftertaste, while the concentration of the dipeptide (0.001%) is about 80% that of its threshold level of sweetness. With this ratio (6:1) of saccharin to dipeptide there is effective masking of the bitter aftertaste of saccharin. The sweetness quality of the solution is evaluated as better than that of Example 2.

EXAMPLE 4

A dry mix is prepared by blending 5.5 g of the potassium salt of penicillin G, 0.5 g of sodium saccharin, 0.15 g of the methyl ester of L-aspartyl-L-phenylalanine, and 58.0 g of fine granulated sugar. A syrup for oral administration is then prepared by adding to the dry mix sufficient water to make 100 ml. The reconsitutted syrup has an improved and enhanced sweetness character due to the dipeptide ester.

What is claimed is:

1. A method of masking the aftertaste of saccharin, which comprises adding to the saccharin a dipeptide ester of the formula $$H_2NCHCONHCHCOO-R$$
$$\phantom{H_2NCH}|\phantom{CONH}|$$
$$\phantom{H_2NCH}CH_2\phantom{CO}Z$$
$$\phantom{H_2NCH}|$$
$$\phantom{H_2NCH}COOH$$

wherein Z is:
—R

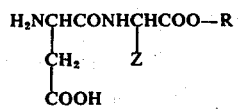

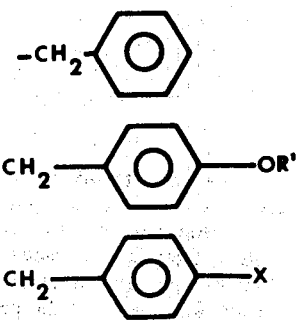

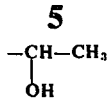

or
−(CH₂)ₙS(O)ₘR wherein R is an alkyl radical of up to 6 carbon atoms, or an alkyl-aryl or alicyclic radical of up to 10 carbon atoms, R' is hydrogen or an alkyl radical of up to 6 carbon atoms, $m$ is 0 or 2, $n$ is 1 or 2, and X is halogen, the dipeptide ester being present in an amount from at least about that amount effective to mask the aftertaste of saccharin and not above about its threshold level of taste.

2. The method as defined in claim 1 wherein Z is

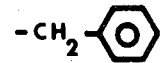

and R is methyl.

* * * * *